United States Patent
Beadle et al.

(10) Patent No.: US 6,321,377 B1
(45) Date of Patent: Nov. 20, 2001

(54) METHOD AND APPARATUS AUTOMATIC SERVICE OF JIT COMPILER GENERATED ERRORS

(75) Inventors: Bruce Anthony Beadle, Round Rock; Michael Wayne Brown, Georgetwon; Michael Anthony Paolini; Douglas Scott Rothert, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,511

(22) Filed: Dec. 3, 1998

(51) Int. Cl.[7] .................................................. G06F 9/45
(52) U.S. Cl. ............................................................ 717/5
(58) Field of Search .................................. 717/5, 6–7, 9; 714/38, 48

(56) References Cited

U.S. PATENT DOCUMENTS

| | | | |
|---|---|---|---|
| 5,784,553 | * | 7/1998 | Kolawa et al. ................. 395/183.14 |
| 5,901,308 | * | 5/1999 | Cohen et al. ........................ 395/591 |
| 5,920,720 | * | 7/1999 | Toutonghi et al. ................... 395/705 |
| 5,937,193 | * | 8/1999 | Evoy ..................................... 395/705 |
| 6,026,485 | * | 2/2000 | O'Connor et al. .................... 712/226 |

OTHER PUBLICATIONS

Dony. Exception Handling and Object–Oriented Programming: Towards a Synthesis. ACM. pp. 322–330. Oct. 1990.*
Sinha et al. Analysis of Programs with Exception–Handling Constructs. IEEE. pp. 348–357. Nov. 1998.*

* cited by examiner

*Primary Examiner*—Kakali Chaki
*Assistant Examiner*—Wei Zhen
(74) *Attorney, Agent, or Firm*—Duke W. Yee; Jeffrey S. LaBaw; Stephen R. Tkacs

(57) ABSTRACT

A method and apparatus in a data processing system for handling exceptions generated during an execution of instructions. An exception is detected, wherein the exception results from the execution of the instructions, wherein the exception has a location within the instructions. A determination is made as to whether the exception has occurred in a compiled portion of the instructions. Responsive to a determination that the exception has occurred in a compiled portion of the instructions, an identification of the compiled portion of the instructions is added to a data structure.

35 Claims, 4 Drawing Sheets

METHOD AND APPARATUS AUTOMATIC SERVICE OF JIT COMPILER GENERATED ERRORS

CROSS REFERENCE TO RELATED APPLICATIONS

The present invention is related to applications entitled A Method And Apparatus To Coordinate And Control The Simultaneous Use Of Multiple Just In Time Compilers With A Java Virtual Machine, Ser. No. 09/204,513, now U.S. Pat. No. 6,233,735; A Method And Apparatus To Selectively Control Processing Of A Method In A Java Virtual Machine, Ser. No. 09/204,512; Method And Apparatus For Dynamically Selecting Bytecodes For Just In Time Compiling In A User's Environment, Ser. No. 09/204,976; A Method And Apparatus For Dynamic Selection Of Which Bytecodes Should Be Just In Time Compiled, Ser. No. 09/204,519; JIT/Compiler Java Language Extensions To Enable Field Performance and Serviceability, Ser. No. 09/204,968; A Method And Apparatus To Selectively Control Processing Of A Method In A Java Virtual Machine, Ser. No. 09/204,975: and Method And Apparatus For Dynamic Selection Of Instructions For Compiling Using Tags, Ser. No. 09/204,516, all of which are filed even date hereof, assigned to the same assignee, and incorporated herein by reference.

BACKGROUND OF THE INVENTION

1. Technical Field

The present invention relates to an improved data processing system and in particular to a method and apparatus for servicing exceptions occurring in a data processing system. Still more particularly, the present invention provides a method and apparatus for servicing just in time compiler generated errors.

2. Description of Related Art

Java is an object oriented programming language and environment focusing on defining data as objects and the methods that may be applied to those objects. Java is designed to solve a number of problems in modern programming practice. Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to a particular computer architecture. A bytecode is a machine independent code generated by the Java compiler and executed by a Java interpreter. A Java interpreter is a module that alternately decodes and executes a bytecode. The decoding of the bytecode places the instruction into an executable form for the computer on which the code is to be executed. Then, the instruction is executed by the computer. These bytecode instructions are designed to be easy to interpret on any machine and easily translated on the fly into native machine code.

The Java virtual machine (JVM) is a virtual computer component that resides only in memory. A JVM includes components necessary to run a program on a computer, including an interpreter. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to a particular computer architecture. A bytecode is a machine independent code generated by the Java compiler and executed by a Java interpreter.

When extra speed in executing a Java program or applet is needed, a just in time (JIT) compiler may be used to translate bytecodes for a method or class into native machine instructions before executing them. Typically, this compilation only occurs once per method. Some JIT compilers may compile entire classes, rather than one method at a time.

In some situations, a JIT compiler may produce invalid results when compiling bytecodes from a given method of a class into instructions or machine code for execution on the computer. These errors do not occur if the code is not just in time compiled. Typically, these errors in execution of native instructions occur as a result of faulty logic in the JIT compiler. Traditionally, this type of error may be addressed by changing the bytecodes to avoid the problem. In many cases, such a fix is not possible or reasonable. Another approach to this problem is to make changes to the JIT compiler itself. Typically, such changes may be slow or infrequent. A third alternative is to disable the JIT compiler, which may result in performance costs for methods that would be JITed and not cause errors or exceptions. Currently, a mechanism for avoiding these errors is unavailable.

Therefore, it would be advantageous to have an improved method and apparatus for servicing errors or exceptions generated by a JIT compiler.

SUMMARY OF THE INVENTION

The present invention provides a method and apparatus in a data processing system for handling exceptions generated during an execution of instructions. An exception is detected, wherein the exception results from the execution of the instructions, wherein the exception has a location within the instructions. A determination is made as to whether the exception has occurred in a compiled portion of the instructions. Responsive to a determination that the exception has occurred in a compiled portion of the instructions, an identification of the compiled portion of the instructions is added to a data structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
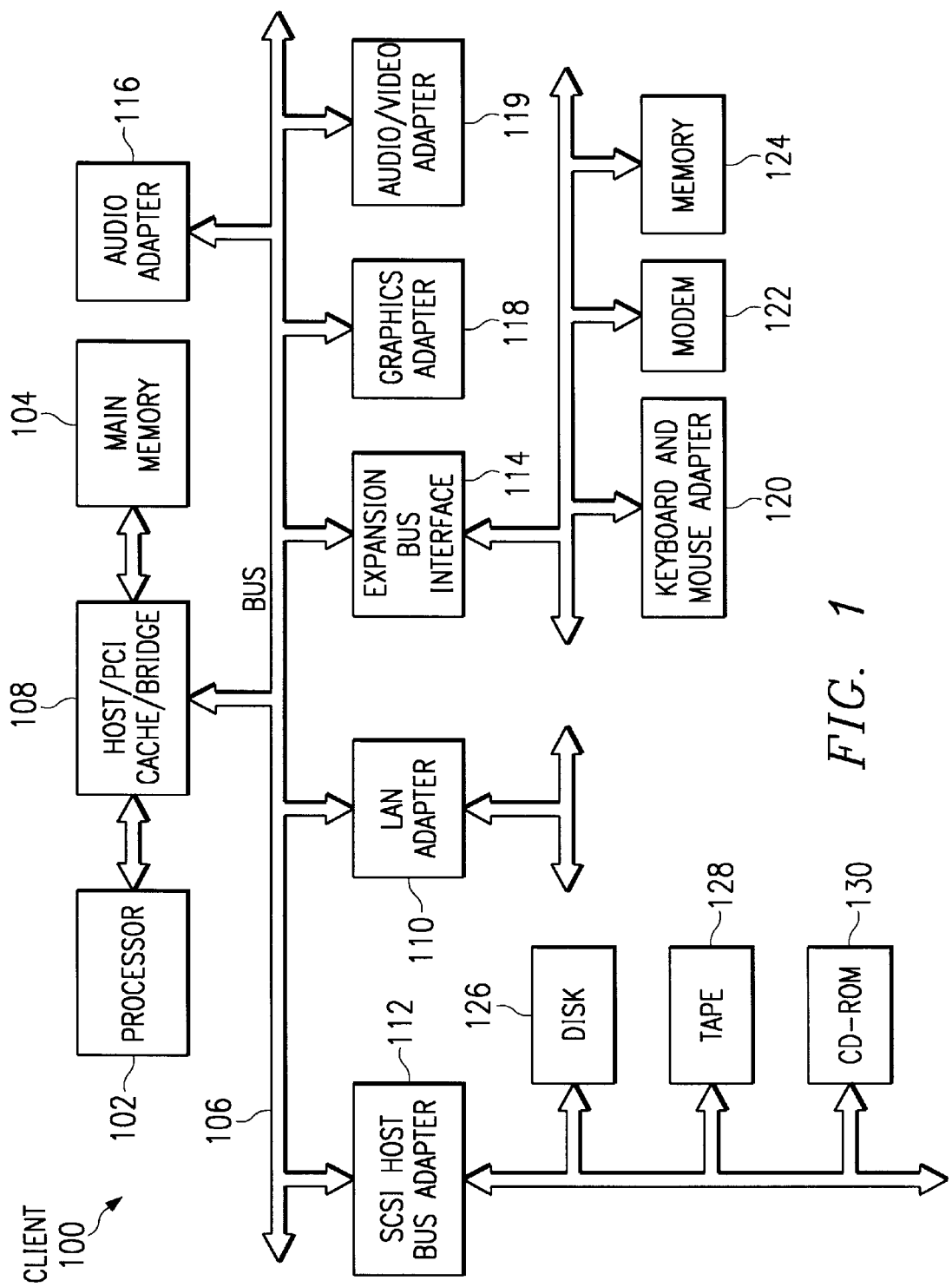
FIG. 1 is a block diagram of a data processing system in which the present invention may be implemented.

With reference now to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures such as Micro Channel and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110 Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130 in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. Instructions for the operating system, the object-oriented operating system, and applications or programs are located on storage devices, such as hard disk drive 126 and may be loaded into main memory 104 for execution by processor 102.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to multiprocessor data processing system.

The present invention provides a method, apparatus, and instructions for selecting which methods are to be just in time compiled, also referred to as being "JITed". The mechanism of the present invention includes an interface that receives a call to just in time compile or "JIT" a method that is normally intended for the just in time (JIT) compiler. A determination is made as to whether to send the method to the JIT compiler. In the depicted example, the method is compared to a database or data structure containing information about methods that are known to produce invalid results or errors when these methods are JITed. If the method is to be JITed, the method is then passed by the interface on to the JIT compiler. Otherwise, the method might be returned to the interpreter in the JVM for processing. Alternatively, the processing of the method may be terminated.

The present invention provides a method, apparatus, and instructions for servicing exceptions caused by a JIT compiler. In the depicted example, the servicing is directed towards fatal exceptions, although the processes also could be applied to other exceptions and to errors. An exception is a problem or change in conditions that causes the microprocessor to stop what it is doing and handle the situation in a separate routine. An exception is similar to an interrupt; both refer the microprocessor to a separate set of instructions. For example, an exception may occur during execution in which instructions generated from being JITed by a JIT compiler results in a divide by zero or in an index being out of bounds. An error is a value or condition that is not consistent with the true, specified, or expected value or condition. The occurrence of an error will usually result in an exception. In computers, an error results when an event does not occur as expected or when impossible or illegal maneuvers are attempted. The present invention provides a mechanism in which exceptions generated from JITed code are evaluated to determine whether an indication should be stored, indicating that the class or method associated with the JITed code should not be JITed the next time that the class or method is executed. In addition, the present invention also provides a mechanism to present the exception to the user and allow the user to enter a response or indication as to how the method or class should be processed the next time. Further, the present invention provides a mechanism for sending this exception information to a destination, such as a server is or computer maintained by the product owner of the code as an alert of the problem caused by JITing the code.

Figure 2:
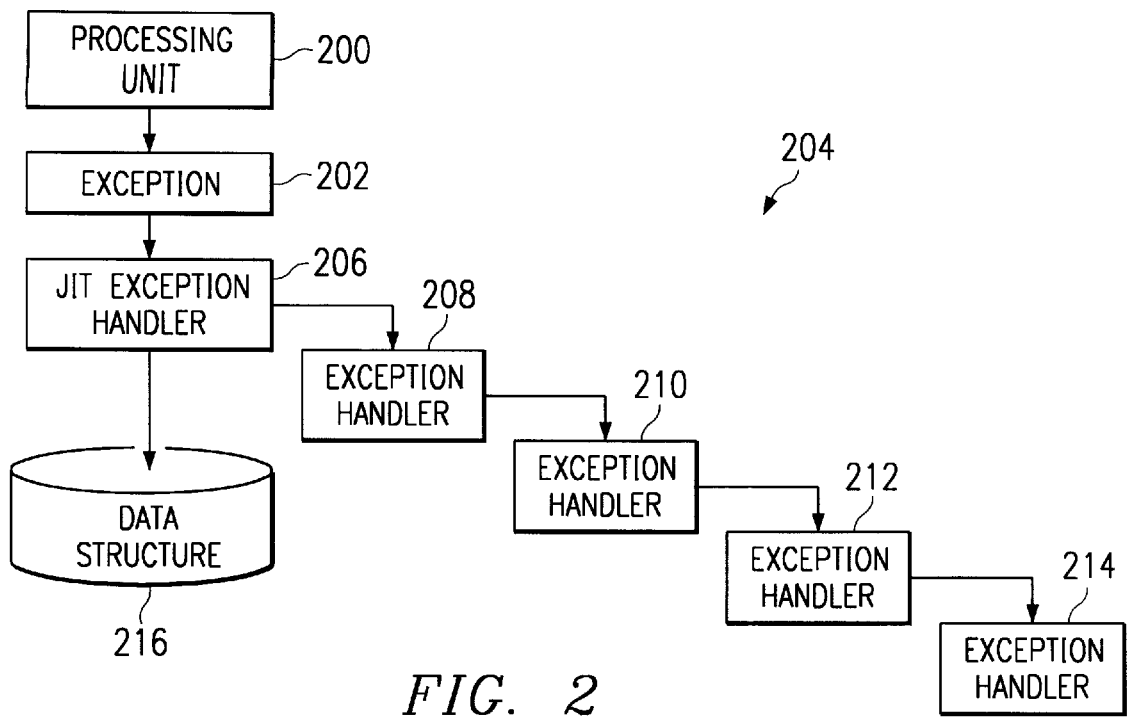
FIG. 2 is a diagram illustrating the components used in the present invention in accordance with a preferred embodiment of the present invention.

With reference now to FIG. 2, a diagram illustrating the components used in the present invention is depicted in accordance with a preferred embodiment of the present invention. In the depicted example, processing unit 200 generates an exception 202, which is passed to an exception handler chain 204, containing exception handlers 206–214. In this example, processing unit 200 may be a processor, an operating system, or a kernel within an operating system that generates exception 202. A kernel is the core of an operating system—the portion of the system that manages memory, files, and peripheral devices; maintains the time and date; launches applications; and allocates system resources. In many cases, the kernel creates exception 202 and passes it to the exception handler chain. The exception handlers within exception handler chain 204 are employed to process exception 202. An exception handler includes a set of routines used to detect or process abnormal condition processing. An exception handler receiving an exception will analyze the exception to determine whether it will process the exception or pass it on to another exception handler in the chain. An exception handler may both process an exception and pass the exception on to another exception handler. In the depicted example, a JIT exception handler, such as JIT exception handler 206 is placed at the beginning of exception handler chain 204. This placement of JIT exception handler 206 at the beginning of exception handler chain 204 allows for an exception, such as exception 202 to be circumvented and/or recorded. The exception may be circumvented in a number of ways. For example, in response to exception 202 being an error caused by JITing of a method, exception handler 206 may execute the method using an interpreter in the JVM instead of the JITed code. Recording of exception 202 may be made in data structure 216. Placement of a JIT exception handler elsewhere in exception handler chain 204, or at the end of exception handler chain 204, allows for recording of the exception, but may not allow for circumventing the exception itself.

Figure 3:
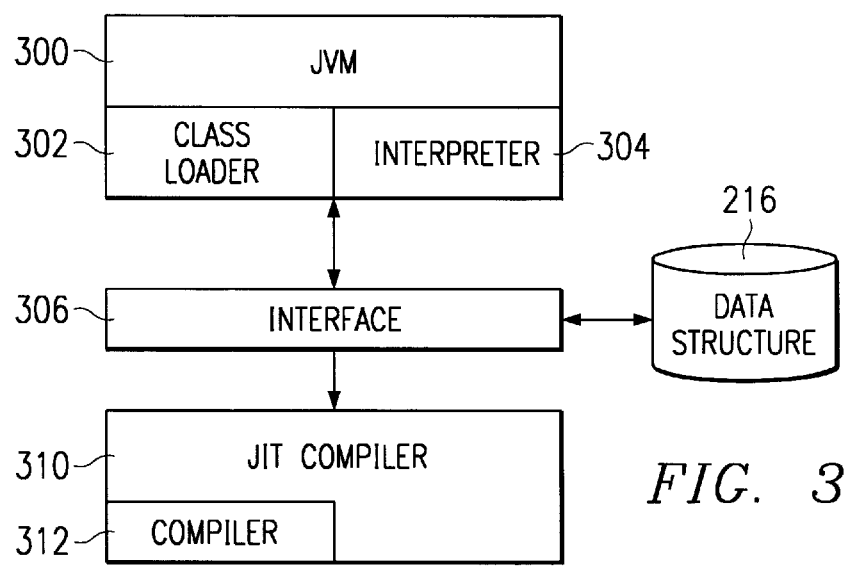
FIG. 3 is a diagram of components used to selectively process methods in accordance with a preferred embodiment of the present invention.

With reference now to FIG. 3, a diagram of components used to selectively process methods are depicted in accordance with a preferred embodiment of the present invention. In this example, JVM 300 includes class loader 302 and interpreter 304. Interface 306 uses data generated by JIT exception handler 206 from FIG. 2 as part of a process to determine whether a method or class should be JITed. In particular, information in data structure 216 is used in the process of determining whether a class and/or method should be JITed. As described above, data structure 216 contains information generated by JIT exception handler 206. Similar reference numerals in different figures are used to identify similar elements. Also shown in FIG. 3 JIT compiler 310 includes a compiler unit 312. JVM 300 and JIT compiler 310 contain other components, which are not shown to avoid obscuring the description of the present invention.

JVM 300 will start execution by invoking a method of a specified class. In the depicted example, this method may be for example, main. The method may pass a single argument in the form of an array of strings. This causes the specified class to be loaded, linked to other types that it uses, and initialized. The loading of a class involves finding the binary form of a class or interface type with a particular name. In the depicted example the loading process is implemented by class loader 302. Class loader 302 in this example includes a ClassLoader class, which includes methods for loading new classes into the Java runtime environment. Interpreter 304 is a program that translates the bytecode to a native instruction and then executes the native instructions. The bytecode is translated into a form executable by the computer on which the JVM is located.

JIT compiler 310 includes a compiler unit 312 incorporating a compiler class, which includes methods for compiling methods to native instructions prior to execution. In this example, the compilation occurs only once per method. Some JIT compilers may compile entire classes, rather than one method at a time. A specific class or method may be compiled by passing an instance of the method or class to compiler unit 312 in JIT compiler 310.

Interface 306 receives the call or passing of the method destined for JIT compiler 310. Interface 306 may receive or intercept the method being passed to compiler 310 by registering itself as a JIT compiler that is to receive the method in place of JIT compiler 310. The method is received from JVM 300 by interface 306 through a compile class API invoked by interpreter 304 in JVM 300. Interface 306 takes the method information received from class loader 302 and determines whether not to JIT compile the method. This determination may be made by comparing the method name to a list or table of methods in a data structure 216, in FIG. 2, containing information about methods that produce invalid results or errors when JITed. This data structure may contain information for a specific JIT compiler, such as JIT compiler 310. If the method is to be JITed, the method is then passed on to JIT compiler 310. Otherwise, interface 306 may place a call to have interpreter 304 interpret the method. Alternatively, processing of the method may be terminated.

Figure 4:
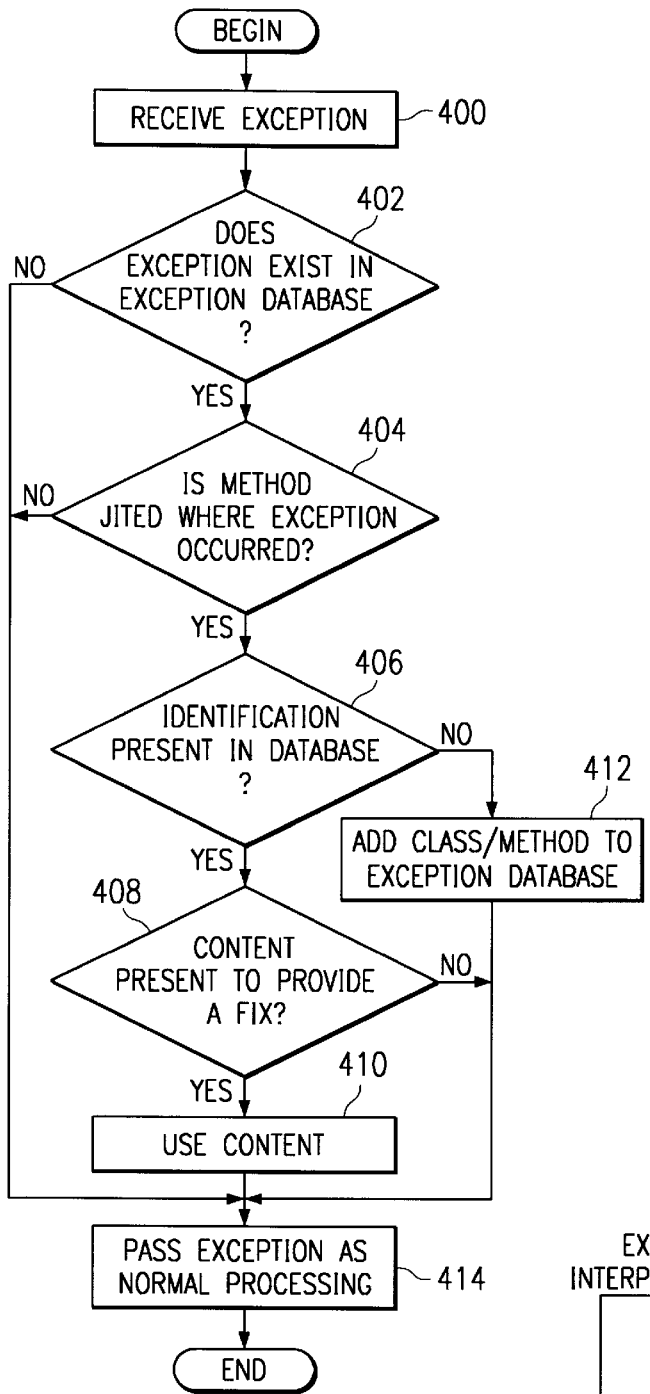
FIG. 4 is a flowchart of a process for handling exceptions in accordance with a preferred embodiment of the present invention.

With reference next to FIG. 4, a flowchart of a process for handling exceptions is depicted in accordance with a preferred embodiment of the present invention. The process in FIG. 4 is used by a JIT exception handler to process exceptions. Although the depicted example is directed towards processing of methods, classes and portions of methods, such as loops, may be processed by an exception handler in a similar fashion. The process begins by receiving an exception (step 400). In response to receiving the exception, a determination is made as to whether the exception exists in an exception database (step 402). In the depicted example, the exception database is stored in a data structure, such as data structure 216 in FIG. 2. Step 402 in this example, checks to see whether the exception is a fatal exception selected for processing by the JIT exception handler. Of course the processes of the present invention also may be applied to other types of exceptions other than fatal exceptions.

If the exception is present in the exception database, a determination is then made as to whether the method was JITed where the exception occurred (step 404). A determination of whether the exception occurred in a method that has been JITed may be made by examining the Java stack frame. If the method was JITed at the location of the exception, a determination is made as to whether an identification of the method is present in the database (step 406). If the identification is present, a determination is made as to whether content is present that provides a fix to avoid a reoccurrence of the exception (step 408). If content is present, the content is then applied or executed (step 410). This content may be, for example, a patch containing instructions generated by an appropriate JIT compiler in which the exception does not occur. The patch may automatically replace the instructions causing the exception with the new set of instructions. For example, an exception may be caused by a set of instructions in the method looping in a path one to many times. The patch may alter the instructions to loop through the path one less time. Alternatively, the content may be a path to a different JIT compiler for which the exception may be avoided when this JIT compiler is used to compile the particular method or class.

Thereafter, the exception is passed on for normal processing (step 414) with the process terminating thereafter. The exception may be passed to another exception handler or simply no action may be taken when the exception is passed on for further handling. With reference again to step 408, if a fix is not present, the process proceeds directly to step 414.

With reference again to step 406, if the method is not present in the database, the method is added to the exception database (step 412). Thereafter, the exception proceeds to step 414 as described above with the process terminating thereafter. In addition, an identification of the method's class also may be added to the database. Alternatively, an identification of the method and the class for the method may be added to the exception database.

Figure 5:
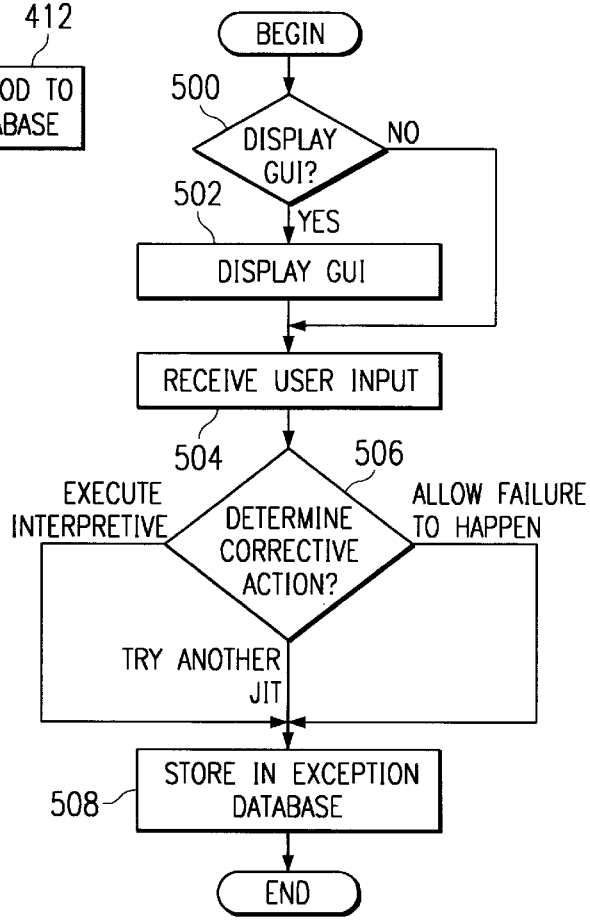
FIG. 5 is a flowchart of a process for allowing a user to determine corrective action in accordance with a preferred embodiment of the present invention.

With reference now to FIG. 5, a flowchart of a process for allowing a user to determine corrective action is depicted in accordance with a preferred embodiment of the present invention. This process allows a user to select the corrective action that is to be taken when an exception occurs in JITed code. This process may be initiated when step 404 in FIG. 4 occurs in place of step 406. The process begins in response to a determination that the method is JITed in the location of the exception by determining whether a graphical user interface (GUI) is to be displayed to the user (step 500). If a GUI is to be displayed, the GUI is then displayed on a screen to the user (step 502). The GUI in this example may display an exception that has occurred and provide graphical indications of corrective actions that the user may take. For example, the GUI may provide choices to allow a user to have the code to be executed interpretively by an interpreter, allow selection of another JIT compiler to JIT compile the code, or allow the failure to occur. Through these selections of corrective actions, exceptions may be avoided without replacing the JIT compiler or the Java code. User input may then be received for the corrective action (step 504). If in step 500, the GUI is not to be displayed, user input, in step 504 also may be received but through another interface, such as a command line interface. Thereafter, the corrective action selected by the user is identified (step 506) with the corrective action then being stored in the exception database for later use in processing the exception (step 508) with the process terminating thereafter.

Figure 6:
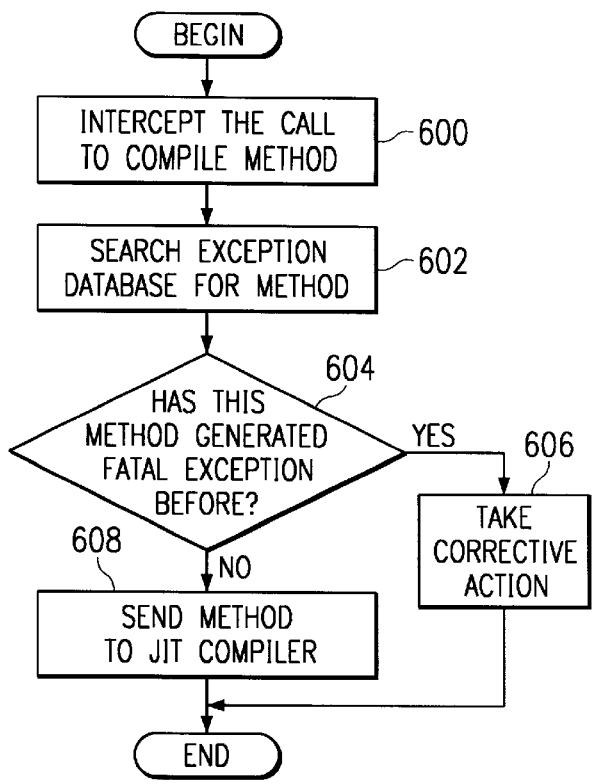
FIG. 6 is a flowchart of a process for selectively compiling methods in accordance with a preferred embodiment of the present invention.

Turning now to FIG. 6, a flowchart of a process for selectively compiling methods is depicted in accordance with a preferred embodiment of the present invention. The process in FIG. 6 is used in an interface, such as interface 306 in FIG. 3 to selectively JIT compile methods based on previously encountered exceptions. The process begins by intercepting a call to compile a method (step 600). After a call has been intercepted, a search is made in the exception database for the method (step 602). Next, a determination is made as to whether the method has previously generated a fatal exception (step 604). If the method has previously generated a fatal exception, the method is then processed using the corrective action found in the exception database for the method (step 606) with the process terminating thereafter. This corrective action may take the form of executing the method by sending it to the interpreter in the JVM. Alternatively, the corrective action may result in the method being JITed using a different JIT compiler, or the corrective action may result in allowing the fatal action to occur.

With reference again to step 604, if the method has not generated a fatal exception previously, the method is compiled by sending the method to the JIT compiler (step 608) with the process terminating thereafter. The process in FIG. 6 also may be applied to an entire class or to portions of a method, such as, for example, bytecodes forming a loop in a method.

Figure 7:
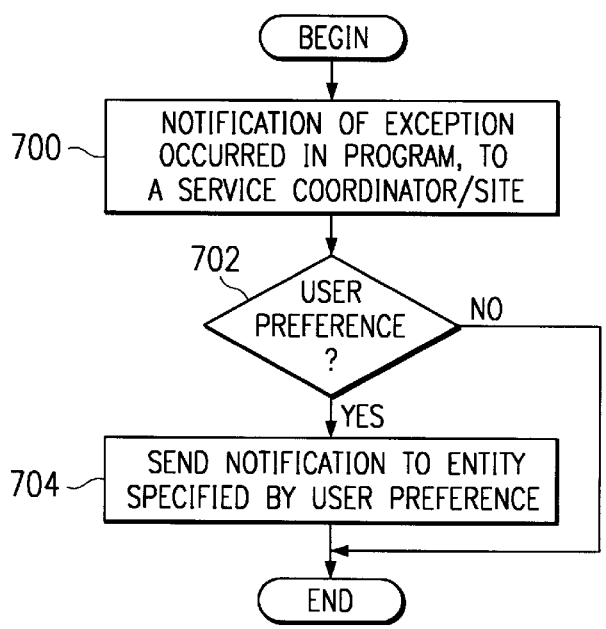
FIG. 7 is a flowchart of the process used to provide notification of the occurrence of an exception in accordance with a preferred embodiment of the present invention.

Turning now to FIG. 7, a flowchart of the process used to provide notification of the occurrence of an exception is depicted in accordance with a preferred embodiment of the present invention. The process begins by sending a notification that an exception has occurred in the Java program to a service coordinator or site (step 700). In many cases the Java program is an applet and the notification will be returned to the particular coordinator or site from which the applet originated or was generated. Thereafter, a determination is made as to whether a user preference has been set for additional notification (step 702). If a user preference has been set, the notification is then sent to an entity specified by the user preference (step 704) with the process terminating thereafter. If a user preference has not been set, the process terminates with no additional logging of the exception. The sending of the notification in the process described in FIG. 7 may be performed using different mechanisms. For example, if the method or class was received using a fully caffienated class file (FCCF), the FCCF may contain information registering a location to which the exception should be sent upon the occurrence of an exception involving the particular method or class. More information on FCCFs and their use may be found in a patent application entitled Method and Apparatus for Optimizing Execution of Java Programs, Ser. No. 09/126,282, filed on Jul. 30, 1998. Alternatively, the notification could be to an error log located locally or on a remote computer. The notification may be sent to the domain registered for the program or to a user preference defined administrator.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media is such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are non-specific to a computer on which the instructions are to be executed. In such a case, a virtual machine on the computer may interpret the instructions or send the instructions to a compiler to generate code suitable for execution by the computer on which the virtual machine is located. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for handling exceptions generated during an execution of instructions, the method comprising:

detecting an exception resulting from the execution of the instructions, wherein the exception has a location within the instructions;

determining whether the exception has occurred in a compiled portion of the instructions; and responsive to a determination that the exception has occurred in a compiled portion of the instructions, adding an identification of the compiled portion of the instructions to a data structure.

2. The method of claim 1 further comprising:

receiving a call to compile a set of instructions;

determining whether the set of instructions corresponds to an identification within the data structure; and responsive to an identification of the set of instructions present within the data structure, executing the instructions without compiling the set of instructions.

3. The method of claim 1 further comprising:
determining whether the exception has previously occurred for the compiled portion of the instructions; and
responsive to a previous occurrence of the exception, sending a notification of the exception to an entity.

4. The method of claim 1, wherein the instructions are an applet.

5. The method of claim 1, wherein the instructions are bytecodes.

6. The method of claim 1, wherein the exception is caused by an error.

7. A method in a data processing system for handling the execution of a set of bytecodes, the method comprising:
detecting the exception, wherein the exception occurred in a location within the set of bytecodes;
determining whether the bytecodes are just in time compiled at the location; and
responsive to a determination that the bytecodes are just in time compiled at the location, adding an identification of the bytecodes at the location to a data structure.

8. The method of claim 7, wherein the bytecodes form a method.

9. The method of claim 7, wherein the bytecodes are part of a class.

10. The method of claim 7, wherein the data processing system includes an interpreter and further comprising:
receiving a plurality of bytecodes for just in time compilation;
determining whether an identification of the plurality of bytecodes is present in the data structure; and
responsive to an identification of the plurality of bytecodes being present in the data structure, sending the plurality of bytecodes to the interpreter.

11. The method of claim 7, wherein the identification of the bytecodes includes an identification of a just in time compiler that compiled the bytecodes and wherein the data processing system includes a plurality of just in time compilers in addition to the just in time compiler and further comprising:
receiving a plurality of bytecodes for just in time compilation by a just in time compiler within the plurality of just in time compilers;
determining whether an identification of the plurality of bytecodes is present in the data structure; and
responsive to an identification of the plurality of bytecodes being present in the data structure, sending the plurality of bytecodes to the interpreter.

12. The method of claim 7, wherein the step of adding an identification occurs if the identification is absent from the data structure.

13. The method of claim 12, further comprising:
responsive to a determination that the identification is present in the data structure,
determining whether content is present to prevent the reoccurrence of the exception.

14. The method of claim 13, wherein the content is an identification of an alternate just in time compiler.

15. The method of claim 13, wherein the content is a replacement set of bytecodes for the set of bytecodes.

16. The method of claim 15, wherein the content replaces the set of bytecodes with the replacement set of bytecodes to avoid a reoccurrence of the exception.

17. A data processing system for handling exceptions generated during an execution of instructions, the data processing system comprising:
detecting means for detecting an exception resulting from the execution of the instructions, wherein the exception has a location within the instructions;
determining means for determining whether the exception has occurred in a compiled portion of the instructions; and
adding means, responsive to a determination that the exception has occurred in a compiled portion of the instructions, for adding an identification of the compiled portion of the instructions to a data structure.

18. The data processing system of claim 17 further comprising:
receiving means for receiving a call to compile a set of instructions;
determining means for determining whether the set of instructions corresponds to an identification within the data structure; and
executing means, responsive to an identification of the set of instructions present within the data structure, for executing the instructions without compiling the set of instructions.

19. The data processing system of claim 17 further comprising:
determining means for determining whether the exception has previously occurred for the compiled portion of the instructions; and
sending means, responsive to a previous occurrence of the exception, for sending a notification of the exception to an entity.

20. The data processing system of claim 17, wherein the instructions are an applet.

21. The data processing system of claim 17, wherein the instructions are bytecodes.

22. The data processing system of claim 17, wherein the exception is caused by an error.

23. A data processing system for handling the execution of a set of bytecodes, the method comprising:
detecting means for detecting the exception, wherein the exception occurred in a location within the set of bytecodes;
determining means for determining whether the bytecodes are just in time compiled at the location; and
adding means, responsive to a determination that the bytecodes are just in time compiled at the location, for adding an identification of the bytecodes at the location to a data structure.

24. The data processing system of claim 23, wherein the bytecodes form a method.

25. The data processing system of claim 23, wherein the bytecodes are part of a class.

26. The data processing system of claim 23, wherein the data processing system includes an interpreter and further comprising:
receiving means for receiving a plurality of bytecodes for just in time compilation;
determining means for determining whether an identification of the plurality of bytecodes is present in the data structure; and
sending means, responsive to an identification of the plurality of bytecodes being present in the data structure, for sending the plurality of bytecodes to the interpreter.

27. The data processing system of claim 23, wherein the identification of the bytecodes includes an identification of a just in time compiler that compiles the bytecodes and wherein the data processing system includes a plurality of just in time compilers in addition to the just in time compiler and further comprising:

receiving means for receiving a plurality of bytecodes for just in time compilation by a just in time compiler within the plurality of just in time compilers;

determining means for determining whether an identification of the plurality of bytecodes is present in the data structure; and sending means, responsive to an identification of the plurality of bytecodes being present in the data structure, for sending the plurality of bytecodes to the interpreter.

28. The data processing system of claim 23, wherein the step of adding an identification occurs if the identification is absent from the data structure.

29. The data processing system of claim 28 further comprising:

determining means, responsive to a determination that the identification is present in the data structure, for determining whether content is present to prevent the reoccurrence of the exception.

30. The data processing system of claim 29, wherein the content is an identification of an alternate just in time compiler.

31. The data processing system of claim 29, wherein the content is a replacement set of bytecodes for the set of bytecodes.

32. The data processing system of claim 31, wherein the content replaces the set of bytecodes with the replacement set of bytecodes to avoid a reoccurrence of the exception.

33. A compute r pro gram product in a computer readable medium for handling exceptions generated during an execution of instructions, the computer program product comprising:

first instructions for detecting an exception resulting from the execution of the instructions, wherein the exception has a location within the instructions;

second instructions for determining whether the exception has occurred in a compiled portion of the instructions; and third instructions, responsive to a determination that the exception has occurred in a compiled portion of the instructions, for adding an identification of the compiled portion of the instructions to a data structure.

34. The computer program product of claim 33 further comprising:

fourth instructions for receiving a call to compile a set of instructions;

fifth instructions for determining within the set of instructions corresponds to an identification within the data structure, and sixth instructions, responsive to an identification of the set of instructions is present within the data, for executing the instructions without compiling the set of instructions.

35. A computer program product in a computer readable medium for handling an execution of a set of bytecodes, the computer program product comprising:

first instructions for detecting the exception, wherein the exception occurred in a location within the set of bytecodes;

second instructions for determining whether the bytecodes are just in time compiled at the location; and third instructions, responsive to a determination that the bytecodes are just in time compiled at the location, for adding an identification of the bytecodes at the location to the data structure.

* * * * *

UNITED STATES PATENT AND TRADEMARK OFFICE
CERTIFICATE OF CORRECTION

| | |
|---|---|
| PATENT NO. : 6,321,377 B1 | Page 1 of 1 |
| DATED : November 20, 2001 | |
| INVENTOR(S) : Beadle et al. | |

It is certified that error appears in the above-identified patent and that said Letters Patent is hereby corrected as shown below:

<u>Title page,</u>
Item [54] Title - after "APPARATUS" insert -- FOR --.
Item [75] Inventors - line 2, delete "Georgetwon" and insert -- Georgetown --;

<u>Column 11,</u>
Line 31, after "A", delete "compute r" and insert -- computer --;
Line 32, before "product", delete "pro gram" and insert -- program --.

Signed and Sealed this

Fourteenth Day of May, 2002

*Attest:*

JAMES E. ROGAN
*Attesting Officer*        *Director of the United States Patent and Trademark Office*